United States Patent
Buhler et al.

(10) Patent No.: US 6,427,781 B1
(45) Date of Patent: Aug. 6, 2002

(54) WHEEL TRACK SCRAPER FOR IRRIGATION SYSTEMS

(76) Inventors: Ronald T. Buhler, 3133 S. 1900 East, Wendel, ID (US) 83355; Wayne D. Buhler, 734 S. 1800 East, Springville, UT (US) 84663

(*) Notice: Subject to any disclaimer, the term of this patent is extended or adjusted under 35 U.S.C. 154(b) by 0 days.

(21) Appl. No.: 09/629,110

(22) Filed: Jul. 31, 2000

(51) Int. Cl.[7] ............................................... A01B 49/02
(52) U.S. Cl. ..................... 172/134; 37/142.5; 239/728
(58) Field of Search ........................ 172/25, 134, 833, 172/624.5, 264, 261; 37/142.5; 239/722, 723, 728

(56) References Cited

U.S. PATENT DOCUMENTS

| | | | |
|---|---|---|---|
| 999,005 A | * 7/1911 | Bateman | |
| 1,260,174 A | * 3/1918 | Fisher | |
| 1,818,656 A | * 8/1931 | Taylor et al. | |
| 2,097,840 A | * 11/1937 | Olmsted | |
| 2,450,200 A | 9/1948 | Locke | 37/178 |
| 2,582,136 A | * 1/1952 | Koblas | |
| 2,623,310 A | * 12/1952 | Raught | |
| 2,722,064 A | * 11/1955 | Jaffe et al. | |
| 2,826,131 A | * 3/1958 | Willet | |
| 3,306,368 A | * 2/1967 | Rosenvold | |
| 3,917,171 A | * 11/1975 | Reinke | |
| 4,059,911 A | * 11/1977 | Bean et al. | |
| 4,192,388 A | * 3/1980 | Goebel | |
| 4,209,068 A | * 6/1980 | Corsentino | |
| 4,262,752 A | * 4/1981 | Parish | |
| 4,601,347 A | * 7/1986 | Parish | |
| 4,909,334 A | 3/1990 | Tanner et al. | 172/58 |
| 5,095,997 A | 3/1992 | Warner et al. | 172/134 |
| 5,802,746 A | * 9/1998 | Miller | |

OTHER PUBLICATIONS

Photograph 1: Disk type track scraper, Photograph 2: Sled type track scraper.

* cited by examiner

Primary Examiner—Victor Batson
(74) Attorney, Agent, or Firm—Frank J. Dykas; Robert L. Shaver; Stephen M. Nipper

(57) ABSTRACT

A wheel track scraper is provided for use with a field irrigation system utilizing a support tower having at least a pair of wheels in trailing alignment wherein the support tower wheels displace dirt as they track a repetitive path across a field as the irrigation system moves. It includes a pair of scraper blades, each having two blade portions joined together at an angle with an apex in the central portion of said scraper blades, attached to an attachment bracket, attached at one end to the support tower, and configured at the other end to hold the pair of opposing scraper blades between said tower wheels and positioned to push field dirt displaced by wheel rotation into the track where the wheel has traveled.

14 Claims, 5 Drawing Sheets

WHEEL TRACK SCRAPER FOR IRRIGATION SYSTEMS

BACKGROUND OF THE INVENTION

1. Field of the Invention

The present invention generally relates to wheel track scrapers for use with irrigation systems, and more particularly for use in leveling or erasing the track ruts created in an irrigated field by the wheels of irrigation support towers.

2. Background Information

One of the more common forms of irrigating agricultural fields is the use of what is commonly know as the pivot irrigation system. In the typical pivot irrigation system, a water riser is located in the center of the field and is connected by some sort of slip ring assembly to an irrigation line which extends radially out and is supported by a plurality of support towers. A plurality of sprinkler heads of one form or another, typically impact sprinklers, are fitted to the irrigation line at spaced intervals to deliver irrigation water to the field below as the irrigation line rotates about the central riser. Water is supplied through a pumping system up through the riser to the irrigation line.

The support towers are typically provided with a pair of drive wheels in tandem. Each support tower is also provided with an electric motor which drives a shaft through a gear box to supply power to the wheels for rotation.

Most pivot tower irrigation systems have the capability of being driven in either direction around the riser. This is an essential feature in fields of odd configuration or there is an obstruction which precludes full circle rotation. And, this is a most useful feature, either for rewatering certain parts of the field, or for aligning the pivot in a specific location in the field, either for maintenance purposes, or in preparation for other field work.

Also, the drive systems are either used to incrementally advance the pivot towers or pivot around the field as irrigation is in process, or are capable of driving the pivot around the field at a constant, but albeit very slow, rate of speed.

The net result is that the tower wheels ride in the same wheel tracks over and over again whether operating in only one direction or in both directions.

In addition to pivot irrigation systems, there are found in practice, line irrigation systems which use similar towers to support an overhead irrigation line which travels in a straight line back and forth across the field with the water supplied through some sort of mechanism alongside of the field. Again, as in the case of a pivot irrigation system, the wheels for the support towers ride continuously in the same track.

Irrespective of what type of overhead irrigation system is used, either the pivot or the line systems, the ground underneath the support towers is wet, soft, and muddy. Since the irrigation systems have considerable weight, the inevitable result is that some of the soft, muddy dirt underneath the irrigation support tower wheels is pushed out or displaced by the wheels, and in short order, a wheel rut is formed from the wheel track.

Having these ruts in the field is undesirable for a number of good reasons. These wheel ruts can serve the unwanted function as irrigation channels which can cause erosion, and runoff of irrigation water from higher portions in the field into lower portions, thus causing uneven irrigation. Additionally, after a growing season of using the pivot irrigation system, the wheel ruts can become quite deep and can cause damage to other equipment working in the field. For example, they can damage harvesting equipment such as tractors, grain combines, and trucks.

And finally, the ruts can cause damage to the sprinklers systems themselves, in that as the wheel ruts deepen it takes more power to move the pivot towers, thereby stressing the motors and gearboxes. Additionally some wheels my spin while others have traction, causing misalignment and damaging the irrigation line.

As a result, it is important to minimize the depth of the wheel ruts caused by the tracking of the irrigation support towers. At least one such attempt has been patented as U.S. Pat. No. 5,095,997 to Warner et al., for floating track erasers. This is a device which is towed behind a tractor and is not suitable for use in many fields with growing crops, for example, a crop of standing corn, since the tractor would be driving across the rows of corn, causing substantial crop damage.

Another attempt is found in U.S. Pat. No. 4,909,334 to Tanner et al., for a machine for filling ruts in agricultural fields. Again, this device is used in conjunction with a tractor, its use of a 3-point hitch, and the power takeoff devices to rotate the tines. Again, it is not suitable for use except before the crop is planted or after it has been harvested.

There have been other attempts to provide for a wheel track scraper which is attached directly to the pivot towers. There are two known to the inventor. The first is the disk type, where a pair of rotating disks similar to those used for standard field disking operations are attached to some sort of a frame, and towed behind the tower, with the disks cutting the dirt displaced by the tower wheels, and returning generally it to its original location. This prior art solution is not satisfactory for a number of reasons, which include at least the following. First, the disks are cutting at all times when the tower is moving, and are very effective at moving dirt, and will actually mound it up on the wheel track, and with extended use may actually create a mound on the wheel track where it should be flat, causing the pivot towers to slide off which causes considerable strain to the pivot towers and their drive systems. In practice, these disk type levelers need regular adjustment to avoid building a mount in the wheel tracks. Also, the disks cut small ditches as they constantly cut in the same place each time the irrigation system moves down the track, and these small ditches oftentimes form unwanted irrigation ditches, which, on a slope, can cause erosion. And finally, the disk systems are only capable of being driven in one direction only, since the disks are angled to each other. Thus, if a farmer were to use a disk system to fill the wheel ruts, the farmer loses the capability of moving the pivot irrigation system in both directions. The farmer losses another capability with the disk type system, namely the ability to cross bridges which are often required to span irrigation canals. Obviously, with a line irrigation system which travels back and forth in a straight line, disks used to fill the wheel ruts are not suitable.

The second prior art attempt to scrape the wheel ruts smooth again that is known to the inventor is the use of a drag sled which is attached to the tower frame by use of chains. It simply drags, of its own weight, behind the wheels in an attempt to push some of the displaced dirt back into the wheel ruts. When the farmer reverses the direction of travel, the trailing wheel becomes the lead wheel, and the wheels run over the sled, hopefully to trail behind the new trailing wheel. Unfortunately, these systems are not reliable and oftentimes it is not uncommon for the chain to bind a wheel of the drive system of the tower, causing significant damage to the sprinkler system. When a wheel binds it can also cause misalignment and cause the irrigation line to bend or break. And finally, like the disk type systems, sled type systems cannot be readily used in fields having bridges over canals.

What is needed is a wheel track scraper which is truly capable of pushing the displaced dirt back into the wheel rut to create a truly flat wheel track, without creating any unwanted mounds of dirt and/or collateral side ditches. What is also needed is a wheel track scraper, with no external power supply, which is mounted to the irrigation system in such a manner that it will not bind with it or create undo stress on the drive system for the support towers. These are objects of the invention.

Another object of the invention is to provide, in at least one embodiment, a wheel track scraper incorporating the features set forth above and is also fully operable and capable of use in either direction of travel.

SUMMARY OF THE INVENTION

These objects are achieved in a wheel track scraper which is attached to a tower frame member of a pivot tower. The wheel track scraper is provided with an attachment bracket which is comprised of a vertical rod attached to a cross bar. The cross bar is in turn attached to the tower frame member by means of a frame plate and u-bolts. This only one of a number of ways of affixing the attachment bracket to the pivot tower, others including welding, bolting, or even forming as an integral piece of the support tower. The vertical rod in the preferred embodiment is height adjustable in relationship to the cross bar to accommodate different heights for the frame member and different diameter tire sizes.

Attached to the vertical rod below the frame member are a pair of pivot arms. The lower pivot arm is supported in the horizontal position by means of a stop bar which is firmly attached to the vertical rod and provides for a preset lowest elevation for the rest of the attachment mechanism and the scraper arms. The upper pivot arm is spring loaded, to urge the upper and lower pivot arms down against the stop bar, yet still provide for some upward travel in the event that either or both scraper bars encounter an obstacle in the wheel track.

In the preferred embodiment, the remainder of the attachment bracket assembly is formed of a pair of horizontal support bracket receivers and scraper bar brackets which interconnect with a pair of scraper blades. In the preferred embodiment, the scraper bar brackets are both offset adjustable and width adjustable within the horizontal support bracket receivers to provide for the spacing of the scraper blades to accommodate different size wheel widths on various pivot tower configurations, and even for different field conditions as may be the case.

In the preferred embodiment, the pair of opposing scraper blades are each formed of two blade portions which are joined together at an angle with an apex in the central portion of the scraper blades. This enables to operator to move the irrigation system in both directions, forward and reverse equally well. In the second embodiment, only a first set of opposing blade portions are used with the second omitted. In this embodiment, the wheel track scraper is only usable in one direction of travel.

In the preferred embodiment, the attachment bracket is positioned so as to locate the scraper blades on the inside between the tandem wheels of the tower, closer to one or the other of them. The reason for positioning the blades close to the wheel is that is minimizes the variations in elevation of the scraper blade vis-à-vis the elevation of the wheel. However it should be apparent to those skilled in the art that the opposing scraper blades could also be positioned in front of, or behind, or even equidistant between two wheels.

In use, first and second scraper blade assemblies will push, either using the first or second portions of the scraper blades, and displace dirt back into the track to fill in the wheel rut as the wheels of the pivot tower move. Also, in practice, no significant mounding occurs as is the case with the prior art disking systems, nor are there any collateral side ditches formed by disk cutting into the dirt, even when there is no wheel rut to fill. In the present invention, if there is no displaced dirt, the scraper blades simply track along with the wheel and do not engage the ground in any significant manner.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
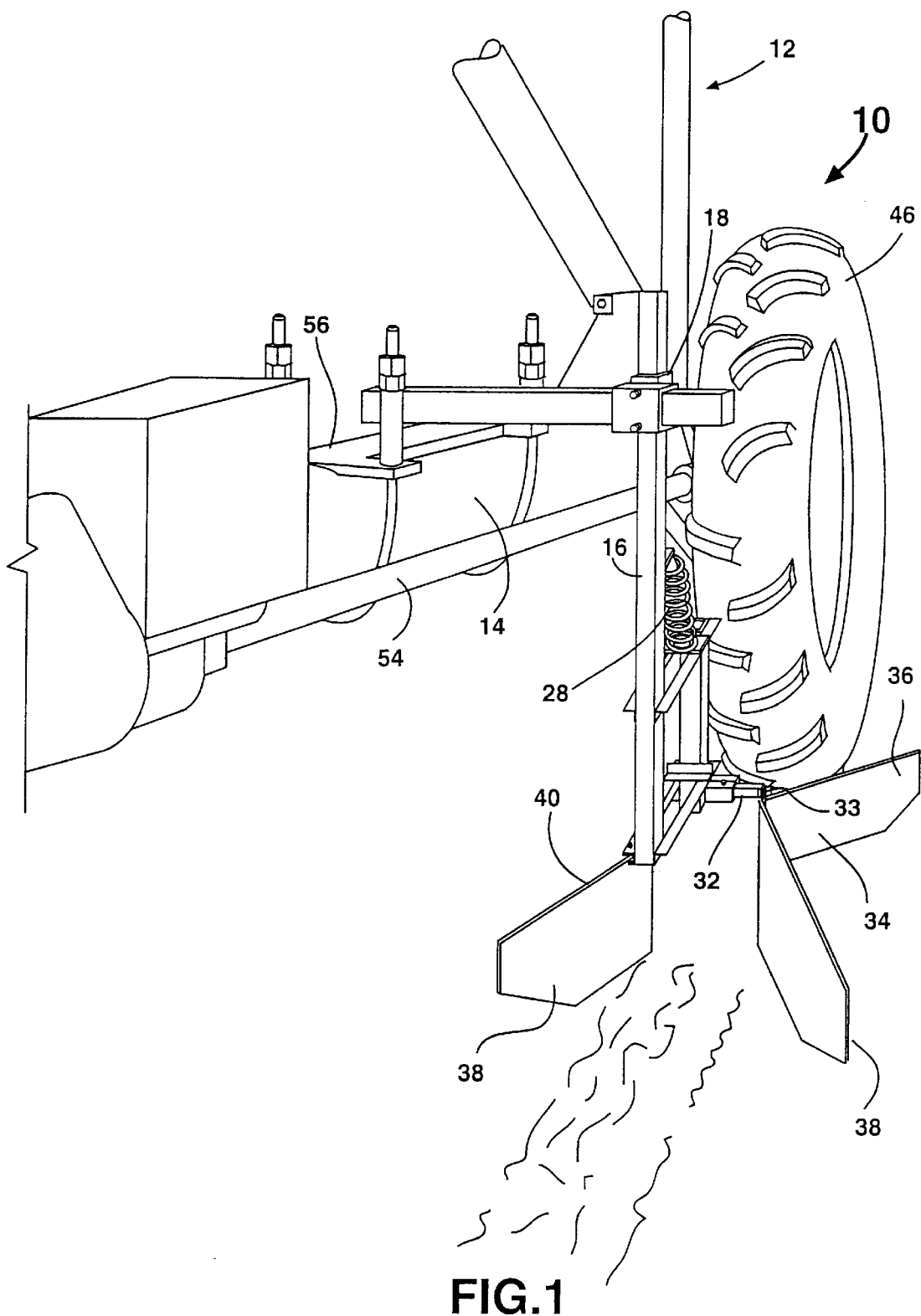
FIG. 1 is a partial perspective representational view of a support tower with the wheel track scraper attached.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 2:
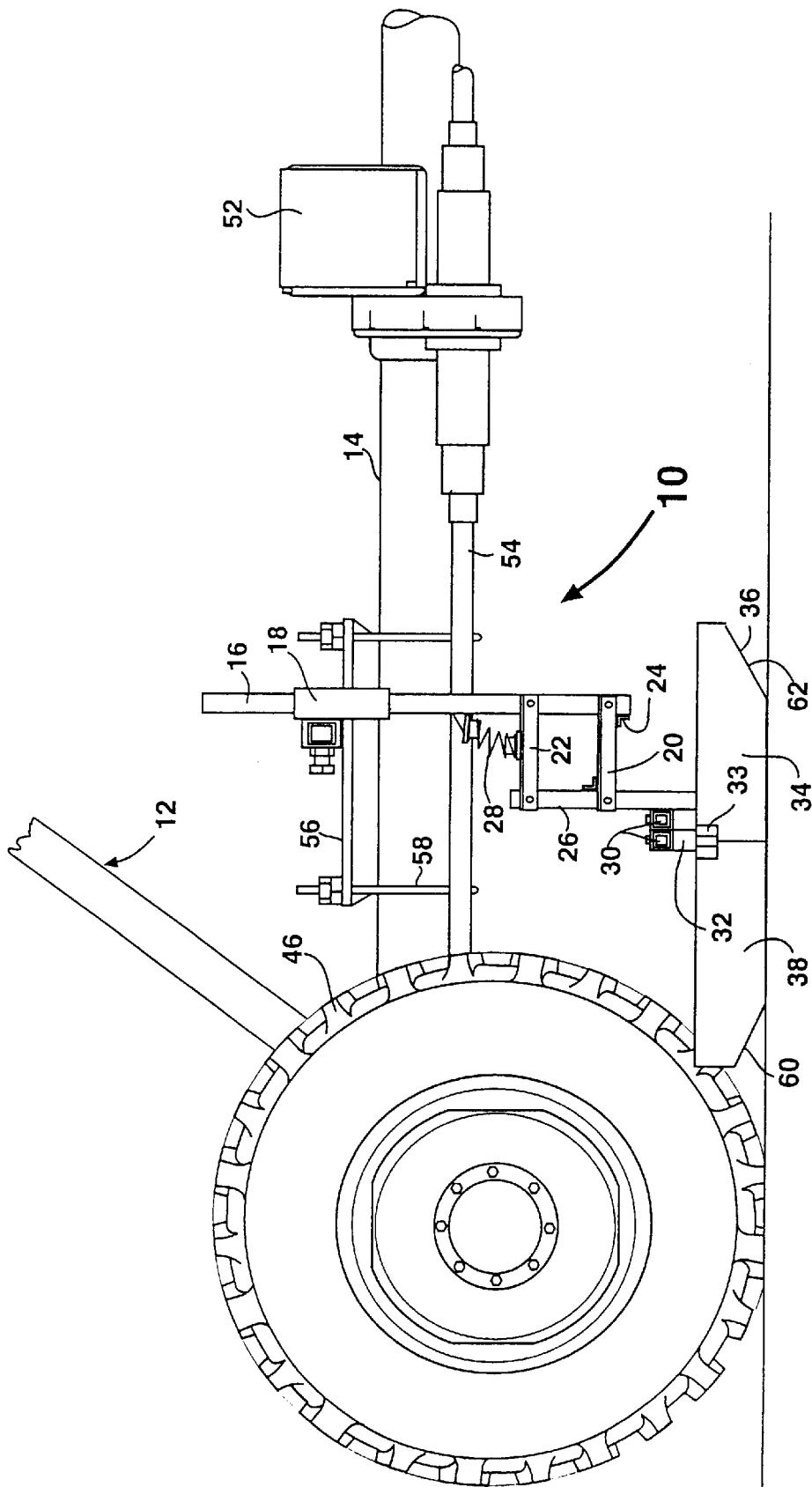
FIG. 2 is a sectional side view of the wheel track scraper attached to a support tower.
Figure 3:
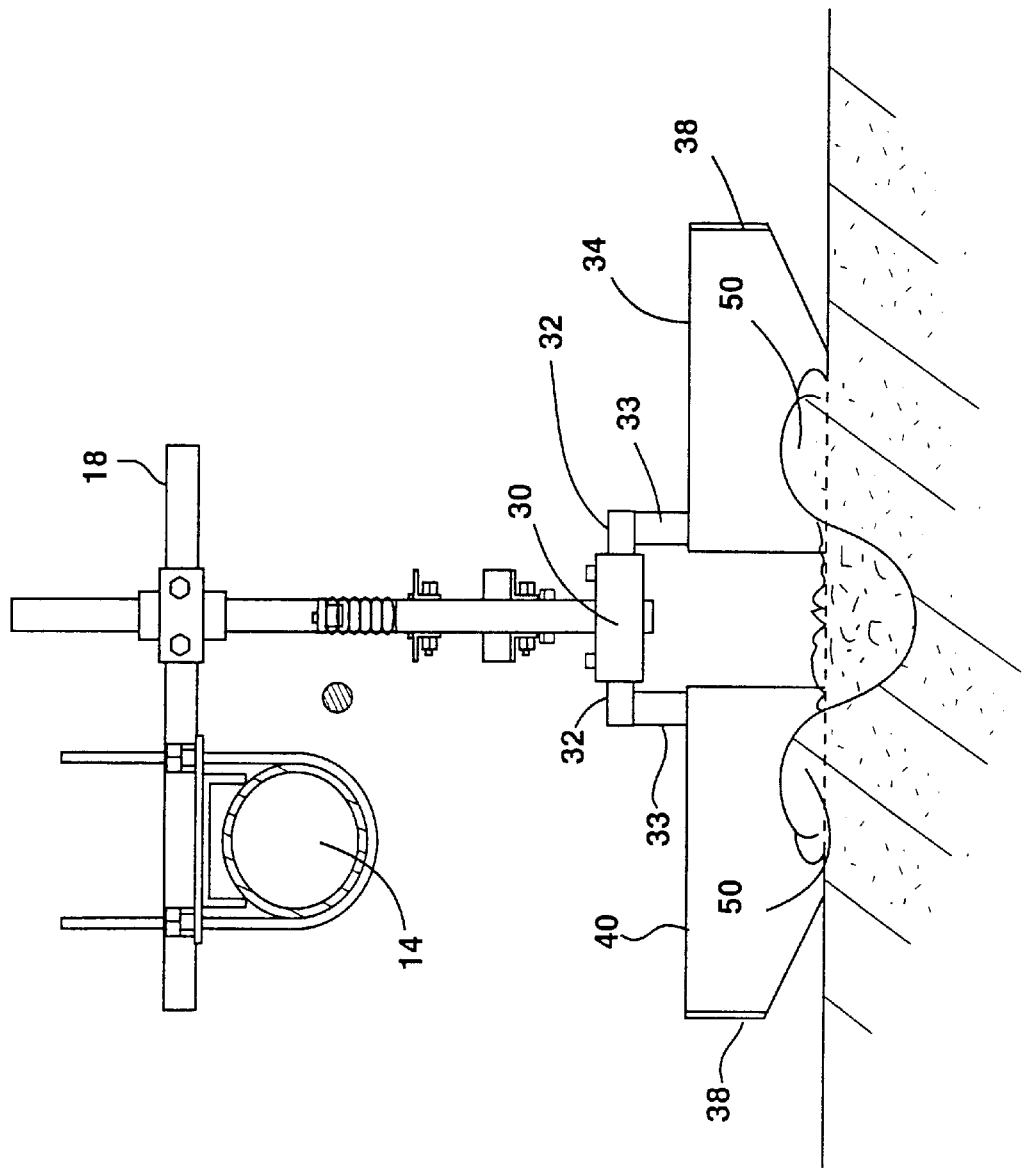
FIG. 3 is an end view of the wheel track scraper.

Fist referring to FIGS. 1, 2, and 3, there is shown to advantage my new wheel track scraper 10 attached to tower frame member 14 of pivot tower 12. Wheel track scraper 10 is provided with an attachment bracket which is comprised of vertical rod 16 attached to cross bar 18. Cross bar 18 is in turn attached to frame member 14 by means of frame plate 56 and u-bolts 58. It should be apparent to those skilled in the art that this is only one of a number of ways of fixing the attachment bracket to the pivot tower. It could be other means such as attaching the bracket by means of welding, bolting, or even forming it as an integral piece of the support tower. Vertical rod 16 is in the preferred embodiment, height adjustable in relationship to cross bar 18 to accommodate different heights for frame member 14 and different diameter tire sizes.

Figure 4:
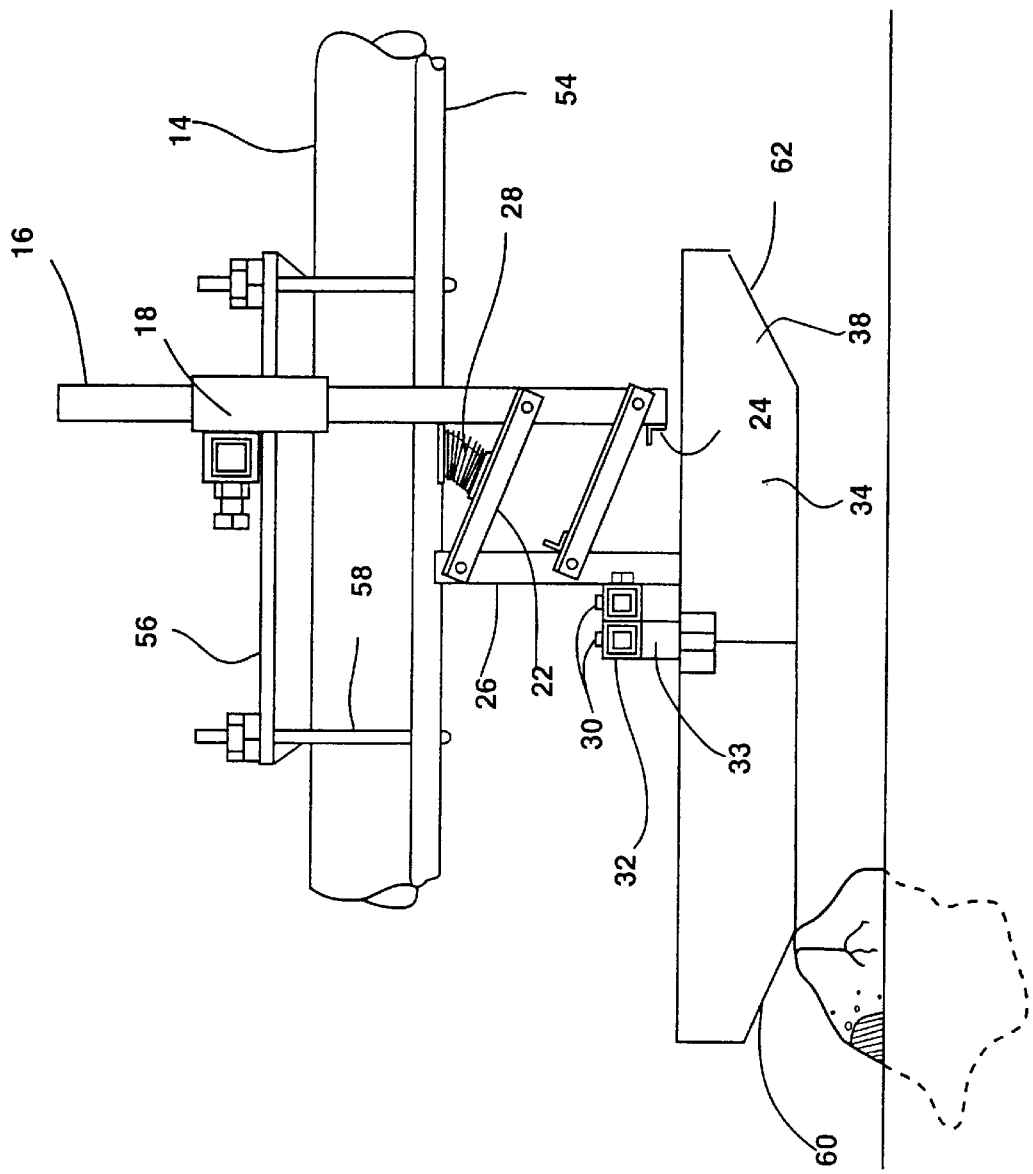
FIG. 4 is a side view showing the wheel track scraper in an elevated position.

Attached to vertical rod 16 below the frame member 14 are a pair of pivot arms 20 and 22. The lower pivot arm 20 is supported in the horizontal position, by means of stop bar 24 which is firmly attached to lower pivot arm 20 and provides for a preset lowest elevation for the rest of the attachment mechanism and the scraper blades by compressive engagement against a portion of vertical rod 16. Upper pivot arm 22 is spring loaded by means of spring 28 to urge upper pivot arm 22 downward, and lower pivot arm 20 downward and against stop bar 24, which is attached to vertical rod 16, yet still provide for some upward travel as shown in FIG. 4, in the event that either or both scraper bars 34 or 40 encounter an obstacle in the wheel track.

In the preferred embodiment, the remainder of the attachment bracket assembly is formed of a pair of horizontal support bracket receivers 30 and scraper bar brackets 32, which interfit within horizontal support bracket receivers 30 and interconnect with scraper bars 34 and 40 by means of vertical brackets 33 which, in the preferred embodiment, are each welded scraper bar and its corresponding scraper bar bracket 32. In the preferred embodiment, the horizontal support bracket and the scraper blade brackets 32 are adjustable to provide for spacing of scraper blades 34 and 40 to accommodate different size wheel widths, and also to offset them as a pair to accommodate different offset distances between the frame member of the pivot tower to which the bracket assembly is attached and the pivot tower wheels, as they may vary between different manufacturers of pivot towers, and finally even different field conditions, as may be the case.

Figure 5:
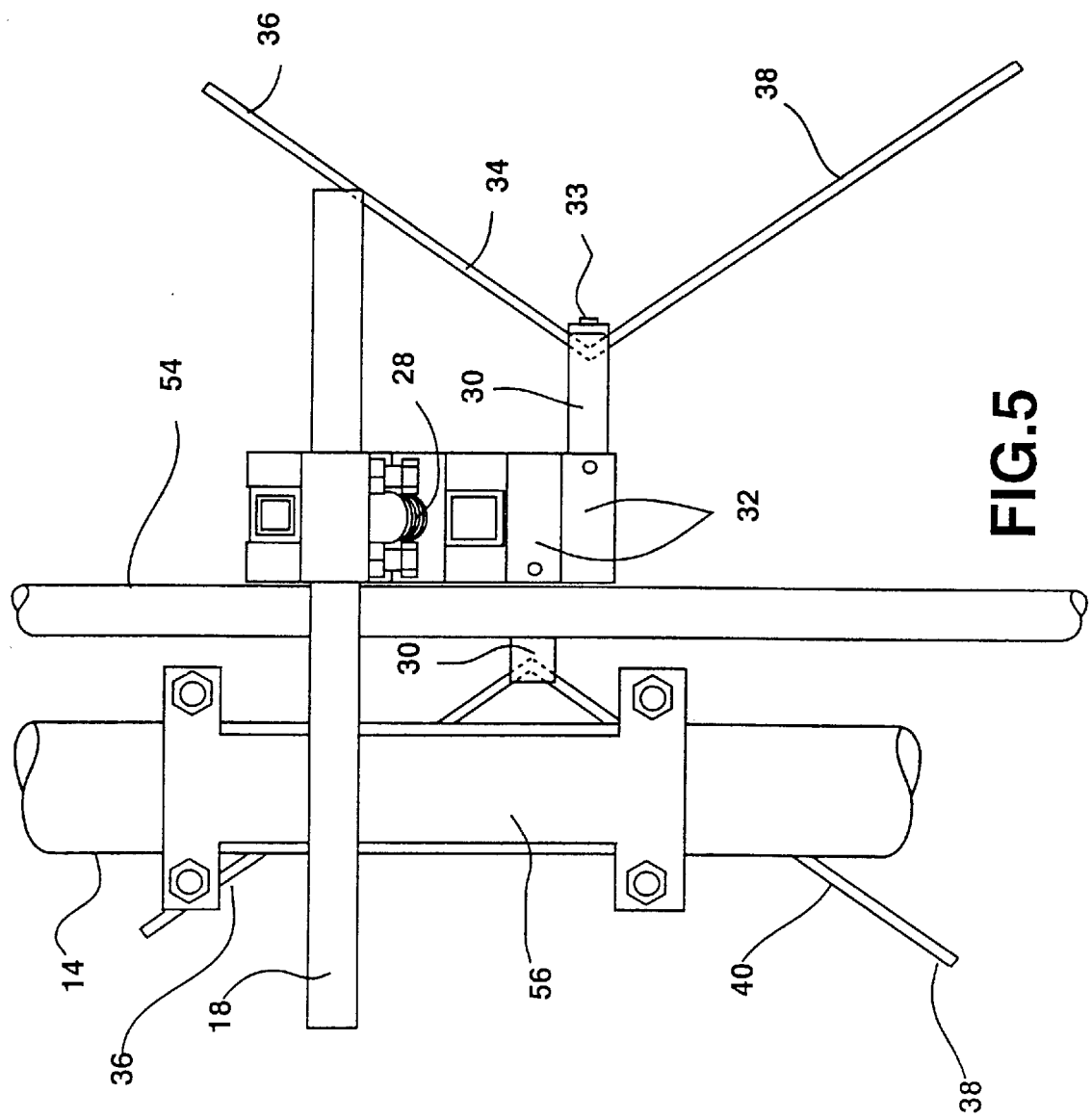
FIG. 5 is a top view of the wheel track scraper attached to a portion of the support tower.

In the preferred embodiment, first and second scraper blades 34 and 40 are each formed of two blade portions 36 and 38, which are joined together at an angle with an apex in the central portion of the scraper blades, forming generally V-shaped scraper blades. This is most clearly shown in FIG. 5. This is an important feature in the preferred embodiment, in that it enables the operator to move the irrigation system in both directions, forward and reverse, equally well. In a second embodiment, only opposing blade portions 38 are used, and blade portions 36 are omitted. In this embodiment, wheel track scraper 10 is only usable in one direction of travel.

In addition, the bottom edges 60 and 62 of each blade portion 36 and 38 is tapered upward towards its outer end as is shown clearly in FIG. 2. The primary purpose is to provide clearance for the scraper blades when the pivot tower is crossing bridges over irrigation canals, which are frequently at a slightly higher in elevation that the field. A secondary consideration is that the tapered bottom edges 60 and 62 may assist in clearing or passing over obstructions in the field, such as small to medium sized rocks.

Also, as shown in FIGS. 1 and 2, in the preferred embodiment, the attachment bracket is positioned so as to locate the scraper blades 34 and 40 on the inside between the tandem wheels of the tower, close to one or the other of them. The reason for positioning the blades close to the wheel is that is minimizes the variations in elevation of the scraper blade vis-à-vis the elevation of the wheel. However it should be apparent to those skilled in the art, the attachment bracket can also be positioned to locate scraper blades 34 and 40 either in front of, or behind, the wheel or wheels of a pivot tower, either will work. The purpose of positioning scraper blades between the wheels, and adjacent to one wheel is to minimize elevational differences between wheel height and the scraper blades.

In FIG. 3, the scraper blades can be seen in operation, wherein wheel rut 48 has been formed by the wheels, and displaced dirt or mud 50 mounds up on either side of wheel rut 48. In use, first and second scraper blade assemblies 34 and 40 will push, either using the first or second portions of the scraper blades, the displaced dirt 50 back into the track.

Also in practice, no significant mounding occurs as is the case with the prior art disking systems, nor are there any collateral side ditches formed by disk cutting into the dirt, even when there is no wheel rut to fill. With the present invention, if there is no displaced dirt, scraper blades 34 and 40 simply track along with the wheel, and do not engage the ground.

While there is shown and described the present preferred embodiment of the invention, it is to be distinctly understood that this invention is not limited thereto but may be variously embodied to practice within the scope of the following claims.

From the foregoing description, it will be apparent that various changes may be made without departing from the spirit and scope of the invention as defined by the following claims.

We claim:

1. A wheel track scraper, for use with a field irrigation system utilizing a wheeled support tower wherein said support tower wheel displaces dirt as it tracks a repetitive path across a field as it rotates, which comprises:
   a pair of generally V-shaped scraper blades; and
   an attachment bracket, attached at a first end to said support tower, and configured at a second end to hold said pair of scrapper blades adjacent to said tower wheel in a position to push field dirt displaced by wheel rotation into the track where the wheel has traveled.

2. The wheel track scraper of claim 1 wherein each of said generally V-shaped scraper blades has a leading first end and a trailing second end wherein said leading first ends oppose one another and said trailing second ends oppose one another, said scraper blades positioned in angled space apart relationship wherein the opposing first ends extend out from the track of the path in the direction of travel of the support tower wheel, and the opposing second ends remain within the track of the path of the support tower wheel trailing behind the opposing first ends.

3. The wheel track scraper of claim 1 which said attachment bracket further comprises a pivot mechanism for allowing upward movement of said scraper blades upon impact with an obstruction, and for urging said scraper blades down to a predetermined elevation at all other times.

4. The wheel track scraper of claim 1 wherein said pair of scraper blades each has a bottom edge which is angled elevationally upward in the direction of travel.

5. A wheel track scraper, for use with a field irrigation system utilizing a wheeled support tower wherein said support tower wheel displaces dirt as it tracks a repetitive path across a field as it rotates, which comprises:
   a pair of scraper blades, each having two blade portions joined together at an angle with an apex in the central portion of said scraper blade; and
   an attachment bracket, attached at a first end to said support tower, and configured at a second end to hold said pair of scrapper blades adjacent to and behind said tower wheel in a position to push field dirt displaced by wheel rotation into the track where the wheel has traveled.

6. The wheel track scraper of claim 5 wherein said pair of scraper blades, each having outer ends and a central apex, are positioned in angled space apart relationship wherein opposing outer ends of each of said scraper blades extend out from opposite sides of the track of the path of travel of the support tower wheel, and said opposing central apexes remain within the track of the path of the support tower wheel.

7. The wheel track scraper of claim 5 which said attachment bracket further comprises a pivot mechanism for allowing upward movement of said scraper blades upon impact with an obstruction, and for urging said scraper blades down to a predetermined elevation at all other times.

8. The wheel track scraper of claim 5 wherein said pair of scraper blades each has a bottom edge which is angled elevationally upward at each end.

9. A wheel track scraper, for use with a field irrigation system utilizing a support tower having at least a pair of wheels in trailing alignment wherein said support tower wheels displace dirt as they tracks a repetitive path across a field as they rotate, which comprises:
   a pair of scraper blades, each having two blade portions joined together at an angle with an apex in the central portion of said scraper blade; and
   an attachment bracket, attached at a first end to said support tower, and configured at a second end to hold said pair of opposing scrapper blades between said tower wheels in a position to push field dirt displaced by wheel rotation into the track where the wheel has traveled.

10. The wheel track scraper of claim 9 wherein said attachment bracket is configured to further position said scraper blades adjacent to one of said wheels.

11. The wheel track scraper of claim 9 wherein said pair of scraper blades, each having outer ends and a central apex, are positioned in angled space apart relationship wherein opposing outer ends of each of said scraper blades extend out from opposite sides of the track of the path of travel of the support tower wheel, and said opposing central apexes remain within the track of the path of the support tower wheel.

12. The wheel track scraper of claim 9 which said attachment bracket further comprises a pivot mechanism for allowing upward movement of said scraper blades upon impact with an obstruction, and for urging said scraper blades down to a predetermined elevation at all other times.

13. A wheel track scraper, for use with a field irrigation system utilizing a wheeled support tower wherein said support tower wheel displaces dirt as it tracks a repetitive path across a field as it rotates, which comprises:
   a pair of scraper blades, each scraper blade having two blade portions joined together at an angle with an apex in the central portion of said scraper blade, each scraper blade further having outer ends, said pair of scraper blades positioned in angled space apart relationship wherein the outer ends of each of said scraper blades extend out from opposite sides of the track of the path of travel of the support tower wheel, and said central apexes remain within the track of the path of the support tower wheel; and
   an attachment bracket, attached at a first end to said support tower, and configured at a second end to hold said pair of scrapper blades adjacent to and behind said tower wheel in a position to push field dirt displaced by wheel rotation into the track where the wheel has traveled.

14. A wheel track scraper, for use with a field irrigation system utilizing a support tower having at least a pair of wheels in trailing alignment wherein said support tower wheels displace dirt as they tracks a repetitive path across a field as they rotate, which comprises:
   a pair of scraper blades, each scraper blade having two blade portions joined together at an angle with an apex in the central portion of said scraper blade, each scraper blade each having outer ends, each scraper blade positioned in angled space apart relationship wherein the outer ends of each of said scraper blades extend out from opposite sides of the track of the path of travel of the support tower wheel, and said central apexes remain within the track of the path of the support tower wheel; and
   an attachment bracket, attached at a first end to said support tower, and configured at a second end to hold said pair of scrapper blades between said tower wheels in a position to push field dirt displaced by wheel rotation into the track where the wheel has traveled.

* * * * *